(12) United States Patent
Chapdelaine-Couture et al.

(10) Patent No.: US 10,964,056 B1
(45) Date of Patent: Mar. 30, 2021

(54) DENSE-BASED OBJECT TRACKING USING MULTIPLE REFERENCE IMAGES

(71) Applicant: Apple Inc., Cupertino, CA (US)

(72) Inventors: Vincent Chapdelaine-Couture, Sunnyvale, CA (US); Mohamed Selim Ben Himane, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 16/408,658

(22) Filed: May 10, 2019

Related U.S. Application Data

(60) Provisional application No. 62/673,223, filed on May 18, 2018.

(51) Int. Cl.
| | |
|---|---|
| *G06T 7/73* | (2017.01) |
| *G06T 7/246* | (2017.01) |
| *H04N 5/235* | (2006.01) |
| *G06T 3/40* | (2006.01) |
| *G06T 7/00* | (2017.01) |

(52) U.S. Cl.
CPC .............. *G06T 7/74* (2017.01); *G06T 3/4007* (2013.01); *G06T 7/248* (2017.01); *G06T 7/97* (2017.01); *H04N 5/2351* (2013.01)

(58) Field of Classification Search
CPC .. G06T 7/74; G06T 7/248; G06T 7/97; G06T 3/4007; H04N 5/2351
USPC ........................................................ 382/103
See application file for complete search history.

(56) References Cited

U.S. PATENT DOCUMENTS

| | | | |
|---|---|---|---|
| 9,087,379 B2 | 7/2015 | Wang et al. | |
| 9,418,480 B2 | 8/2016 | Issa et al. | |
| 9,667,873 B2 | 5/2017 | Mulloni et al. | |
| 9,754,419 B2 | 9/2017 | Petrovskaya et al. | |
| 2007/0122001 A1* | 5/2007 | Wang ................. | G06K 9/00208 382/103 |
| 2007/0268295 A1* | 11/2007 | Okada ................ | G06K 9/00369 345/474 |
| 2007/0297695 A1* | 12/2007 | Aratani .................... | G06T 7/73 382/284 |
| 2008/0152218 A1* | 6/2008 | Okada .................. | G06K 9/6282 382/159 |
| 2008/0292131 A1* | 11/2008 | Takemoto ................. | G06T 7/80 382/100 |
| 2011/0052013 A1* | 3/2011 | Sasahara ................. | G06T 7/149 382/118 |

(Continued)

*Primary Examiner* — Juan A Torres
(74) *Attorney, Agent, or Firm* — Thompson Hine LLP

(57) ABSTRACT

One exemplary implementation involves a pixel-based (also referred to as a dense-based approach) to object detection and tracking that can provide more accurate results than a feature-based approach. The efficiency of the detection and tracking is improved by using a reference image of the object that has similar characteristics (e.g., scale, lighting, blur, and the like) as the depiction of the object in the frame. In some implementations, a reference image of an appropriate scale is selected or interpolated based on the scale of the object depicted in the real world image. In other implementations, the real world image is adjusted to better match the reference image. The detection and tracking of the object can be performed with sufficient accuracy and efficiency for computer-generated reality (CGR) and other applications in which it is desirable to detect and track objects in real time.

25 Claims, 10 Drawing Sheets

(56) References Cited

U.S. PATENT DOCUMENTS

2013/0234926 A1\* 9/2013 Rauber ............... G06F 3/04817
345/156

\* cited by examiner

900

Obtain image data representing a physical environment —910

Determine a pose of an object in a current frame in the image data —920

Present CGR content depicting the physical environment and additional content based on the pose of the object —930

Determine a scale of an object based on the image data —1010

Based on the scale, select or interpolate a reference image of the object from a set of multiple reference images corresponding to different scales —1020

Determine the pose of the object based on the selected reference image and the current frame —1030

FIG. 10

DENSE-BASED OBJECT TRACKING USING MULTIPLE REFERENCE IMAGES

CROSS-REFERENCE TO RELATED APPLICATION

This Application claims the benefit of U.S. Provisional Application Ser. No. 62/673,223 filed May 18, 2018, which is incorporated herein in its entirety.

TECHNICAL FIELD

The present disclosure generally relates to detecting and tracking objects in images, and in particular, to systems, methods, and devices for tracking real world objects in images to provide computer-generated reality ("CGR") content.

BACKGROUND

Various electronic devices include image sensors that capture images of the real world environment. For example, many mobile devices include image sensors that can be used to capture a sequence of frames (e.g., video frames) that are presented on the displays of such devices or stored for later viewing. Detecting and tracking the objects that appear in such frames is desirable for a variety of applications. However, such detecting and tracking of objects is often imprecise and computationally intensive because the depictions of such objects can vary significantly depending upon viewing distance, viewing angle, object orientation, lighting condition, blur conditions, etc. Moreover, existing detecting and tracking techniques can take a significant amount of time and computing resources. These and other deficiencies make existing systems ill-suited for computer-generated reality ("CGR") content applications and other applications in which it is desirable to detect and track objects in real time, e.g., at or around the time at which the image of the object is received.

SUMMARY

Various implementations disclosed herein include devices, systems, and methods that determine a scale associated with a depiction of a real world object in an image and use that scale to more efficiently and accurately detect or track the object. Exemplary implementations of the disclosure involve a pixel-based (also referred to as a dense-based approach) to object detection and tracking that can provide more accurate results than a feature-based approach. The efficiency of the detection and tracking is improved by using a reference image of the object that has a similar scale to the depiction of the object in the frame. In some implementations, a reference image of an appropriate scale is selected or interpolated based on the scale of the object depicted in the real world image. In other implementations, the real world image is adjusted to better match the reference image. The detection and tracking of the object can be performed with sufficient accuracy and efficiency for computer generated reality (CGR) and other applications in which it is desirable to detect and track objects in real time, i.e., at or around the time at which the image of the object is received.

Some implementations of the disclosure involve, on a computing device having a processor, a memory, and an image sensor, obtaining image data representing a physical environment using the image sensor. The image data includes one or more images, for example, including a sequence of frames of a video. These implementations next determine a pose of an object in an image, e.g., in a current frame. Determining the pose of the object estimates the object's position and orientation in 3D space. In some implementations the object's pose is determined by determining a scale of the object, for example, based on the pose of the object in a preceding frame in a sequence of frames. Based on the scale, a reference image of the object is selected from a set of multiple reference images of the object corresponding to different scales or interpolated from a reference image of the object. For example, the reference image of the object can be selected or interpolated to have a same or similar scale to the expected scale of the object depicted in the frame. In some implementations, the pose is determined based on a single reference image, e.g., corresponding to the entire object. In other implementations, the pose is determined based on multiple reference images of the object corresponding to different scales for different portions of the object. In one example, this involves determining a pixel-wise scale of the object, for each pixel, selecting or interpolating a respective reference image of the multiple reference images based on the pixel-wise scale, and determining the pose of the object in the current frame based on the reference images selected or interpolated for each pixel.

The pose of the object is then determined based on the selected or interpolated reference image and the current frame. For example, this can involve determining a transform of a pose of the object in the preceding frame using an optimization that accounts for differences in pixels between the selected/interpolated reference image and the current frame. Some implementations further involve presenting computer generated reality (CGR) content on a display, the CGR content depicting the physical environment based on the image data and additional content based on the pose of the object in the current frame.

Some implementations of the disclosure involve, on a computing device having a processor, a memory, and an image sensor, obtaining image data representing a physical environment using the image sensor. The image data includes one or more images, for example, including a sequence of frames of a video. These implementations next determine a pose of an object in an image, e.g., in a current frame. Determining the pose of the object estimates the object's position and orientation in 3D space. In some implementations, the object's pose is determined by determining a scale of the object, for example, based on the pose of the object in a preceding frame in a sequence of frames. The current frame (e.g., at least a portion of the current frame corresponding to the depiction of the object) is then adjusted based on the scale. For example, the current frame can be scaled up or down so that the depiction of the object in the frame has a scale that is similar to a reference image. A pose of the object in the current frame is then determined based on a reference image and the adjusted current frame. Computer generated reality (CGR) content can then be presented on a display depicting the physical environment based on the image data and additional content based on the pose of the object in the current frame.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, an image sensor, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 9 is a flowchart representation of a method for presenting CGR content based on a pose of an object in a current frame.

FIG. 10 is a flowchart representation of a method for determining a pose of an object based on a reference image selected based on a scale of the object.

Figure 1:
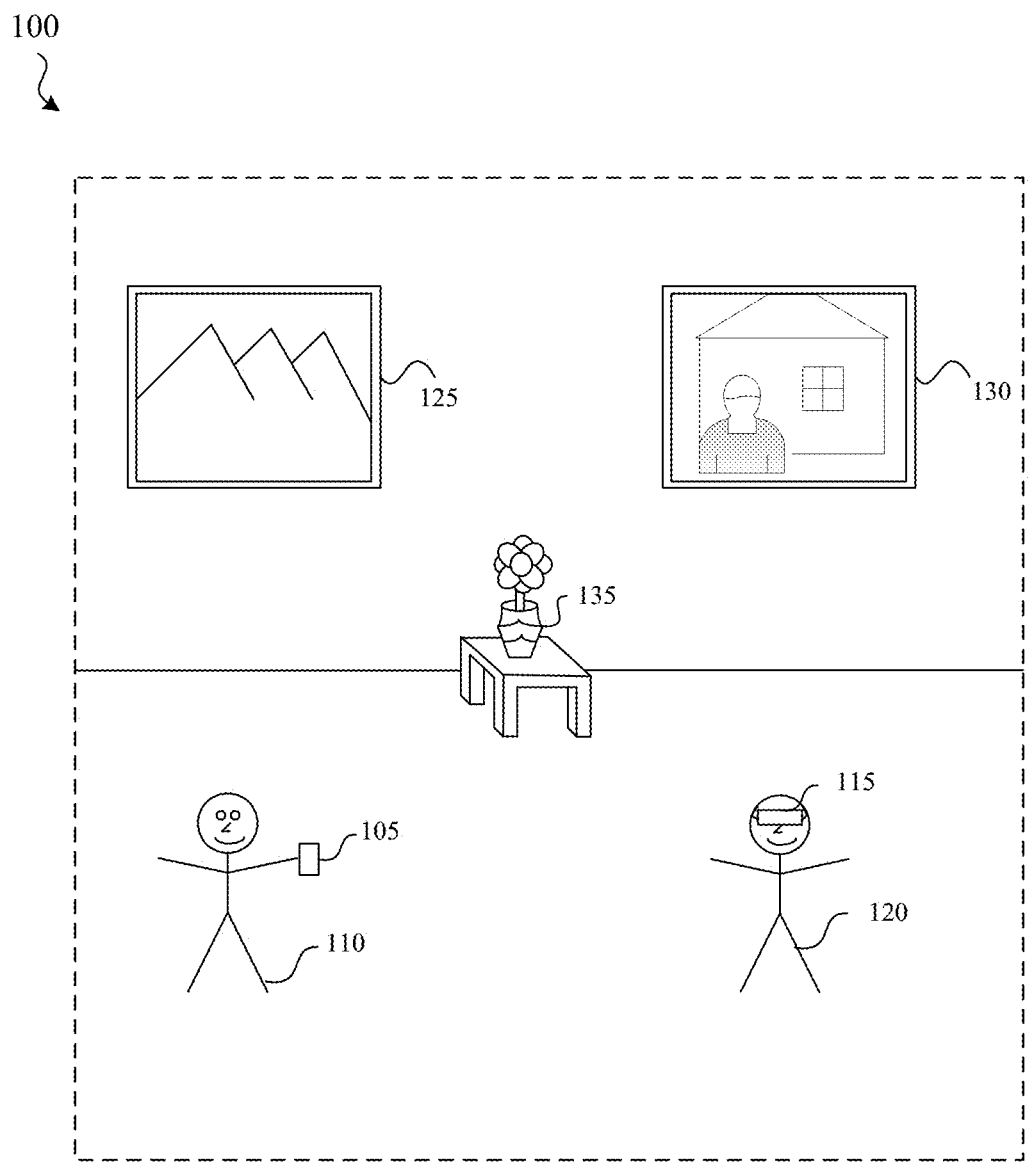
FIG. 1 is a block diagram of an example environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example environment 100 for implementing aspects of the present disclosure is illustrated. In general, operating environment 100 represents two devices 105, 115 amongst real world objects. As depicted in the example of FIG. 1, the environment 100 includes a first device 105 being used by a first user 110 and a second device 115 being used by a second user 120. In this example, the environment 100 is a museum that includes picture 125, picture 130, and vase 135. The two device 105, 115 can operate alone or interact with additional devices not shown to capture images of the environment, detect or track objects in those images, or to present a computer generated reality (CGR) environment based on the images and the detected/tracked objects. Each of the two device 105, 115 may communicate wirelessly or via a wired connection with a separate controller (not shown) to perform one or more of these functions. Similarly, each of the two device 105, 115 may store reference images and other object-specific information useful for these functions or may communicate with a separate device such as a server or other computing device that stores this information. For example, the museum may have compiled a collection of reference images of the real world objects, 3D models of the real world objects, and descriptive information of the real world objects that are stored on or accessible via the two device 105, 115. These representations of real world objects may be used by devices 105 and 115 to detect and track the real world objects in images captured by the devices.

A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. As used herein, an HMD in which at least some light of the physical environment may pass through a transparent or translucent display is called an "optical see through" HMD.

Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display.

Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment.

Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, a device, such as device 115, is a head-mounted device (HMD) that is worn by a user. An HMD may enclose the field-of-view of the second user 120. The HMD can include one or more CGR screens or other displays configured to display an CGR environment. In some implementations, an HMD includes a screen or other display to display the CGR environment in a field-of-view of the second user 120. In some implementations, the HMD is worn in a way that a screen is positioned to display the CGR environment in a field-of-view of the second user 120.

In some implementations, a device, such as the first device 105 is a handheld electronic device (e.g., a smartphone or a tablet) configured to present the CGR environment to the first user 110. In some implementations, the first device 105 is a CGR chamber, enclosure, or room configured to present a CGR environment in which the first user 110 does not wear or hold the first device 105.

The first device 105 and the second device 115 are each configured to use images or other real world information detected based on a camera or other image sensor. In some implementations, to provide the CGR environment, the first device 105 uses at least a portion of one or more camera images captured by a camera. For example, the first device 105 and the second device 115 may be configured to augment an image captured by a camera or other sensor with virtual content, such as a virtual object, text, or the like. In some examples, it may be desirable to associate (e.g., attach or position in proximity) the virtual content with one or more real world objects in the captured image. To do so, the first device 105 and second device 115 may detect a real world object in the captured image and determine its pose (e.g., position and orientation) across multiple image frames. The virtual object may then be placed in the captured image accordingly. In some examples, the first device 105 and the second device 115 may track a real world object in a captured image using a dense-based tracking algorithm that attempts to minimize an error between a reference image of the real world object to be tracked and a transformed version of the real world object in the captured image.

In some implementations, the first device 105 and second device 115 enable the user to change the viewpoint or otherwise modify or interact with the CGR environment. In some implementations, the first device 105 and second device 115 are configured to receive user input that interacts with displayed content. For example, a virtual object such as an information bubble with interactive commands may be presented in the CGR content. A user may reposition the bubble relative to the depicted real world objects or interact with the interactive commands by providing user input on or otherwise using the respective device. In one example, a user verbally states "tell me more about this painting" to initiate or change the display of an information bubble providing information about the painting.

Figure 2:
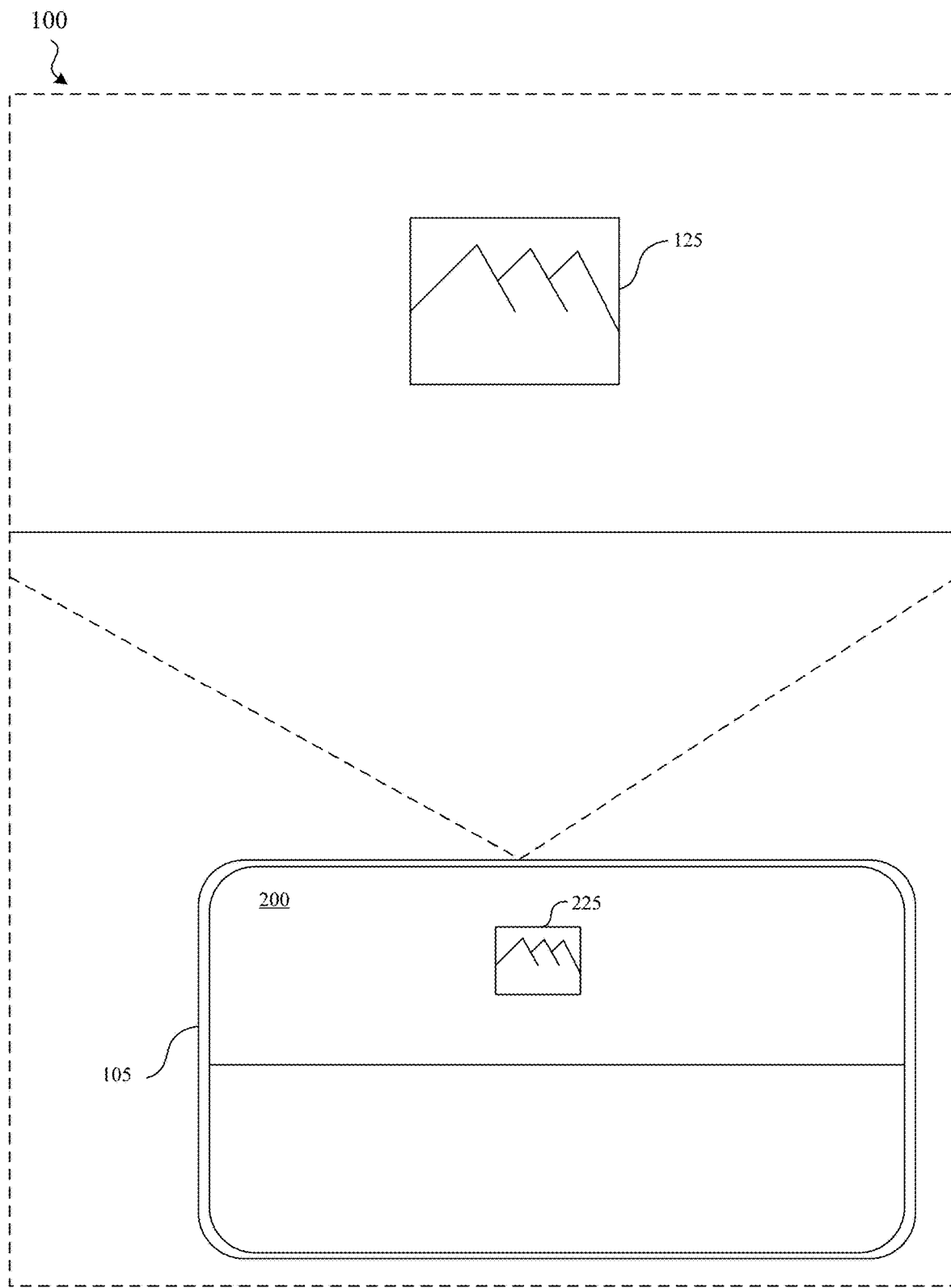
FIG. 2 is a block diagram of a mobile device capturing a frame of a sequence of frames in the environment of FIG. 1 in accordance with some implementations.

FIG. 2 is a block diagram of the first device 105 capturing an image 200 in the environment of FIG. 1 in accordance with some implementations. In this example, the first user 110 has positioned the first device 105 in the environment 100 such that an image sensor of the first device 105 captures an image 200 of the picture 125. The captured image may be a frame of a sequence of frames captured by the first device 105, for example, when the first device 105 is executing a CGR application. In the present example, the first device 105 captures and displays image 200, including a depiction 225 of the picture 125. As mentioned above, to detect and track depiction 225 of picture 125 in captured image 200, the first device 105 may include a reference image of picture 125. The first device 105 may iteratively determine transform parameters between the depiction 225 of picture 125 in a sequence of captured images and the reference image of picture 125 such that an error between the reference image and transformed versions of depiction 225 are minimized.

Figure 3:
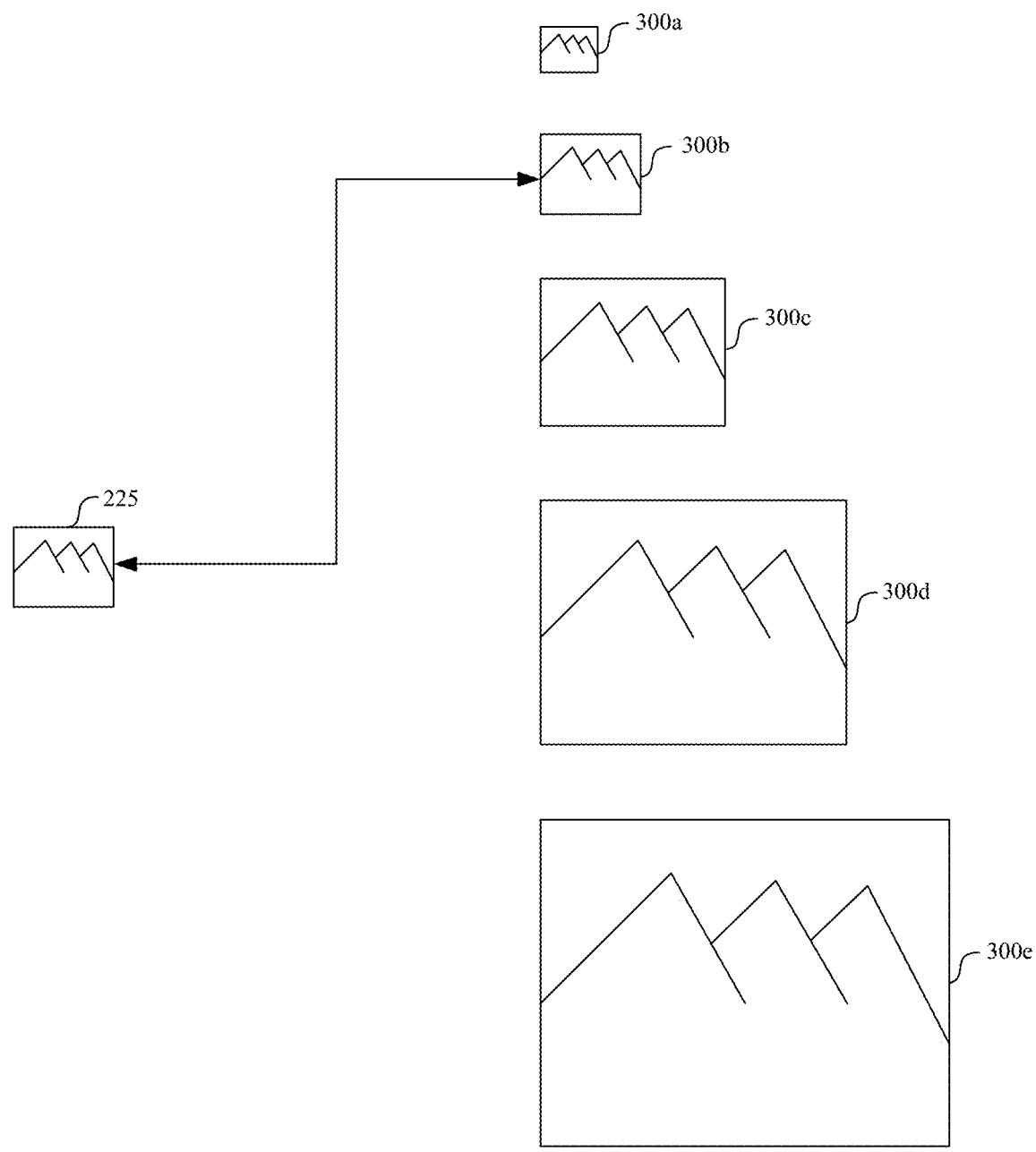
FIG. 3 is a block diagram depicting a selection of a reference image of an object having a scale similar to the scale of an object depicted in the captured real world image of FIG. 2 in accordance with some implementations.

Unlike conventional tracking systems that include a single reference image of an object to be tracked, devices 105, 115 may include multiple reference images that vary in characteristics, such as size, lighting condition, blur condition, or the like. This allows devices 105, 115 to select the reference image(s) that are most similar to the depiction of the object in a captured image. For example, FIG. 3 is a block diagram depicting a selection of a reference image 300b of the picture 125 having a scale corresponding (e.g., similar) to the scale of the depiction 225 of the picture 125 in the captured real world image 200 of FIG. 2. In some implementations, the scale of the depiction 225 of the picture 125 is determined based on the scale of the object known from a preceding frame in a sequence of frames. For example, the first device 105 may initially detect an object and determine its initial pose (e.g., position and orientation in 3D space relative to the camera of first device 105) based on an object detection and localization algorithm, visual inertial odometry (VIO) information, infrared data, depth detection data, RGB-D data, other information, or some combination thereof. In this example, in subsequent frames of the sequence of frames, the first device 105 may determine an appropriate transform (e.g., adjustment of the pose) to determine the pose of the object in each subsequent frame. For example, first device 105 may detect and determine the pose of the object relative to the camera of first device 105 in an initial image (e.g., using a sparse feature-comparison technique). The pose determined for the initial image may be used as an estimate for a transform for the same object contained in a subsequent image, and that estimate may be refined to minimize an error between a transformed version of the object contained in the subsequent image and the reference image of the object. Thus, given a current frame, the pose of the object in the preceding frame is known and used to determine a scale of the object in that preceding frame. Assuming that the change in scale is relatively small from frame to frame, the scale of the object in the preceding frame is used as an estimate of the scale of the object in the current frame. If, however, it is determined that the scale of the object has changed from that of the preceding frame, the estimated scale for a subsequent frame may be adjusted accordingly. In other examples, the scale of the object is determined based on information from the current frame without using scale information from a preceding frame.

As illustrated in FIG. 3, the scale is used to select an appropriate reference image 300b from a set of reference images 300a-e that depicts the object using a plurality of different scales. The set of reference images 300a-e can be created from a given reference image using any suitable scaling technique. In some implementations, the set of reference images 300a-e is created by scaling a given reference image up or down by varying amounts using an up-sampling technique or a down-sampling technique. Similarly, the reference images 300a-e may alternatively or additionally vary in lighting condition, blur, or the like, and may be created from a given reference image by applying various image processing techniques to simulate different lighting conditions or blur effects. In this way, a developer or other user may provide only a single reference image of an object to be tracked and multiple reference images representing various conditions (e.g., distance, lighting, blur, etc.) may be created.

In some implementations, multiple reference images are selected for a current frame. For example, a portion (e.g., particular pixels) of the depiction 225 could correspond to scale 300b and another portion (e.g., other pixels) of the depiction 225 could correspond to scale 300c.

Figure 4:
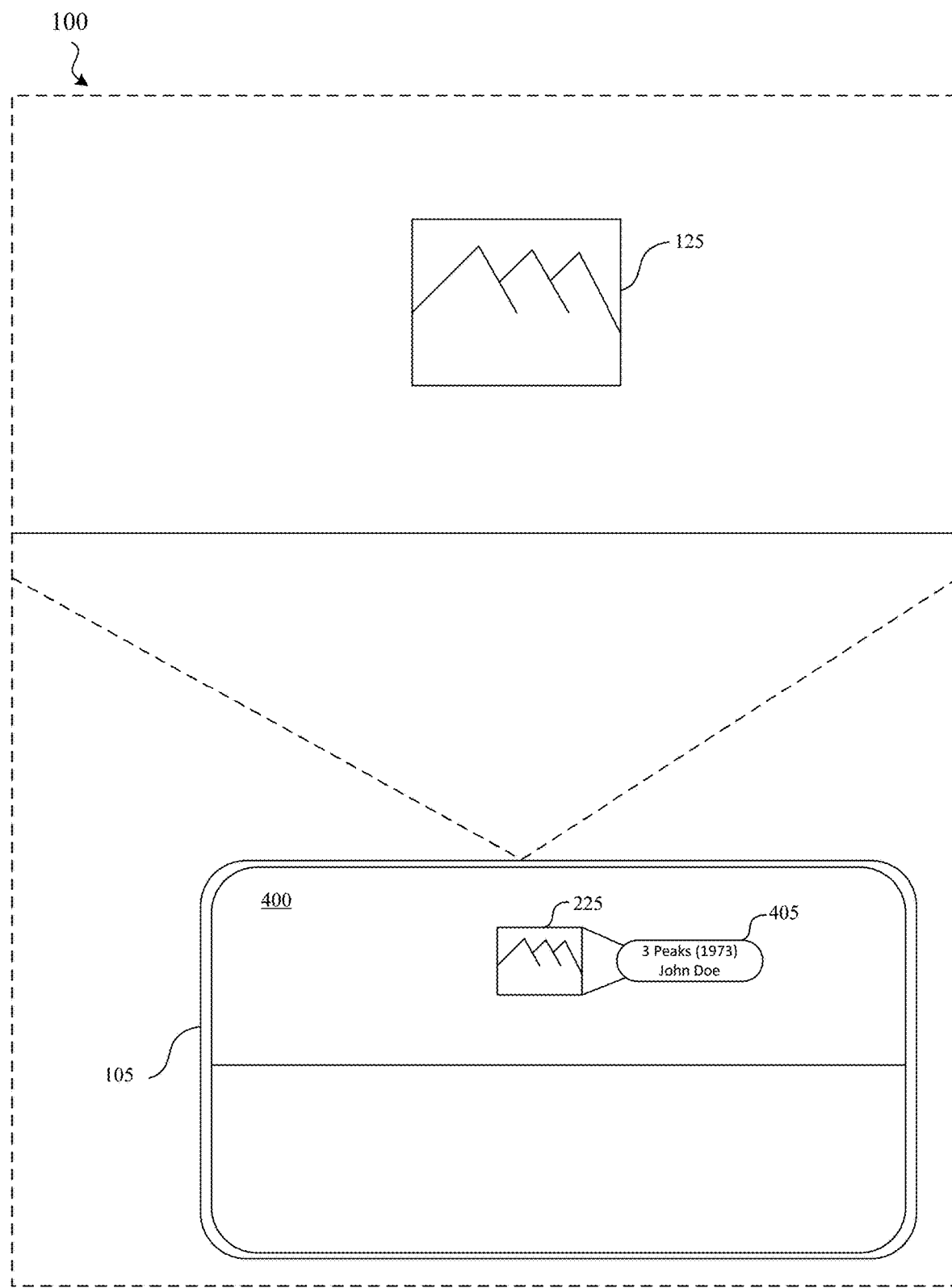
FIG. 4 is a block diagram of the mobile device of FIG. 2 presenting CGR content that includes additional content based on a pose of the object determined based on the selected reference image of FIG. 3.

FIG. 4 is a block diagram of the mobile device 105 of FIG. 2 presenting computer generated reality content 400 that includes the depiction 225 of the picture 125 and additional content 405 that is positioned based on a pose of the object, which was determined based on the selected reference image of FIG. 3. The pose of the object, for example, can be determined by determining an appropriate transform (e.g., adjustment) of a known pose of the object in a preceding frame. For example, this can involve determining a transform of a pose of the object in the preceding frame using an optimization that accounts for differences in pixels between the selected reference image and the current frame. The optimization can select a transform that minimizes differences between pixels corresponding to the reference image of the object and pixels corresponding to the depiction of the object in the frame (e.g., the depiction of the object in the frame transformed using the selected transform). The pixels involved in such an optimization can be adjusted for lighting, blur, etc.

In this example, the additional content 405 includes an information bubble with lines that intersect precisely with the corners of the depiction 225 of the picture 125. The precise intersection is enabled by the accurate and efficient determination of the pose of the object using the techniques disclosed herein.

Figure 5:
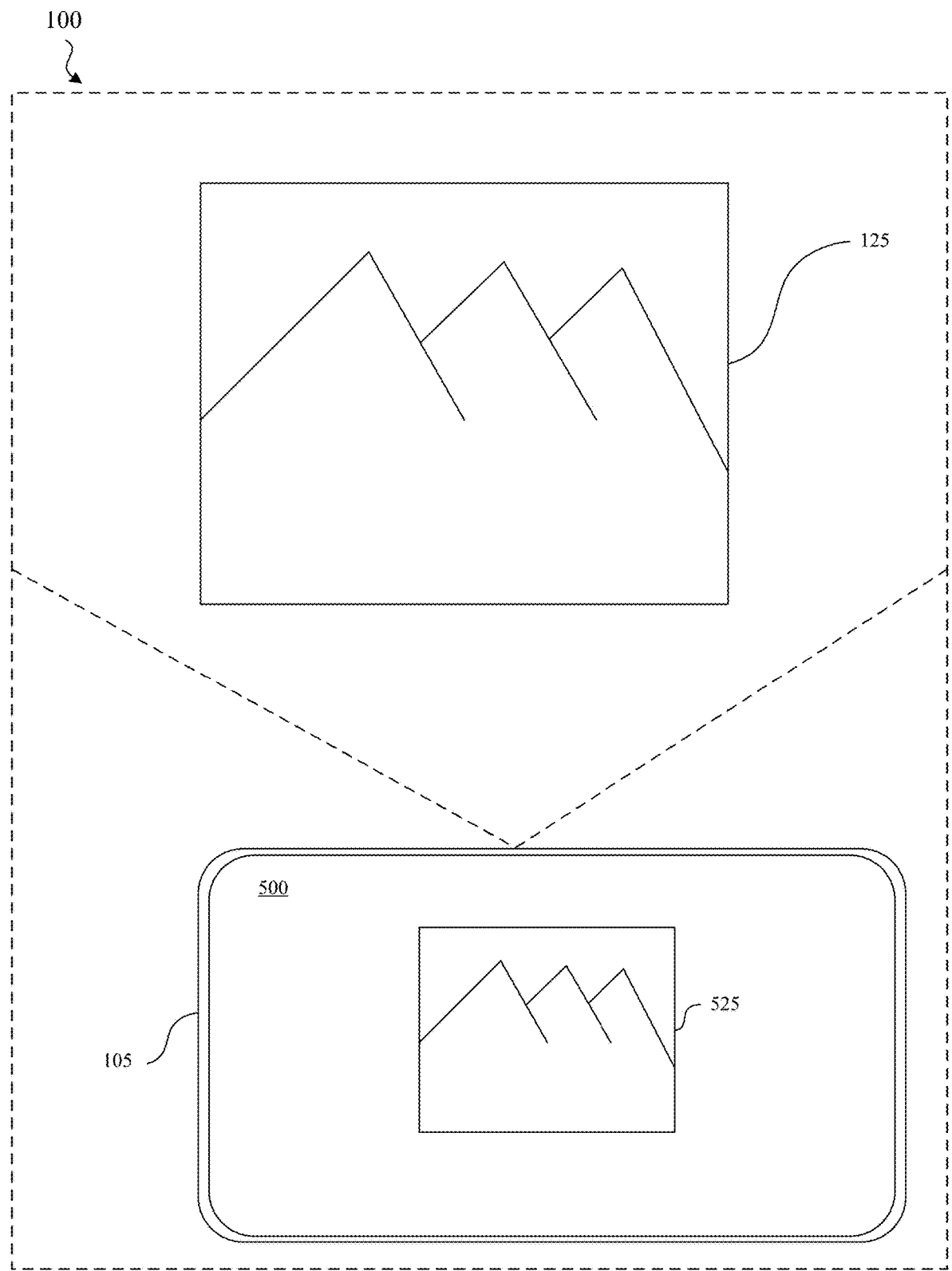
FIG. 5 is a block diagram of a mobile device capturing another frame of a sequence of frames in the environment of FIG. 1 in accordance with some implementations.
Figure 6:
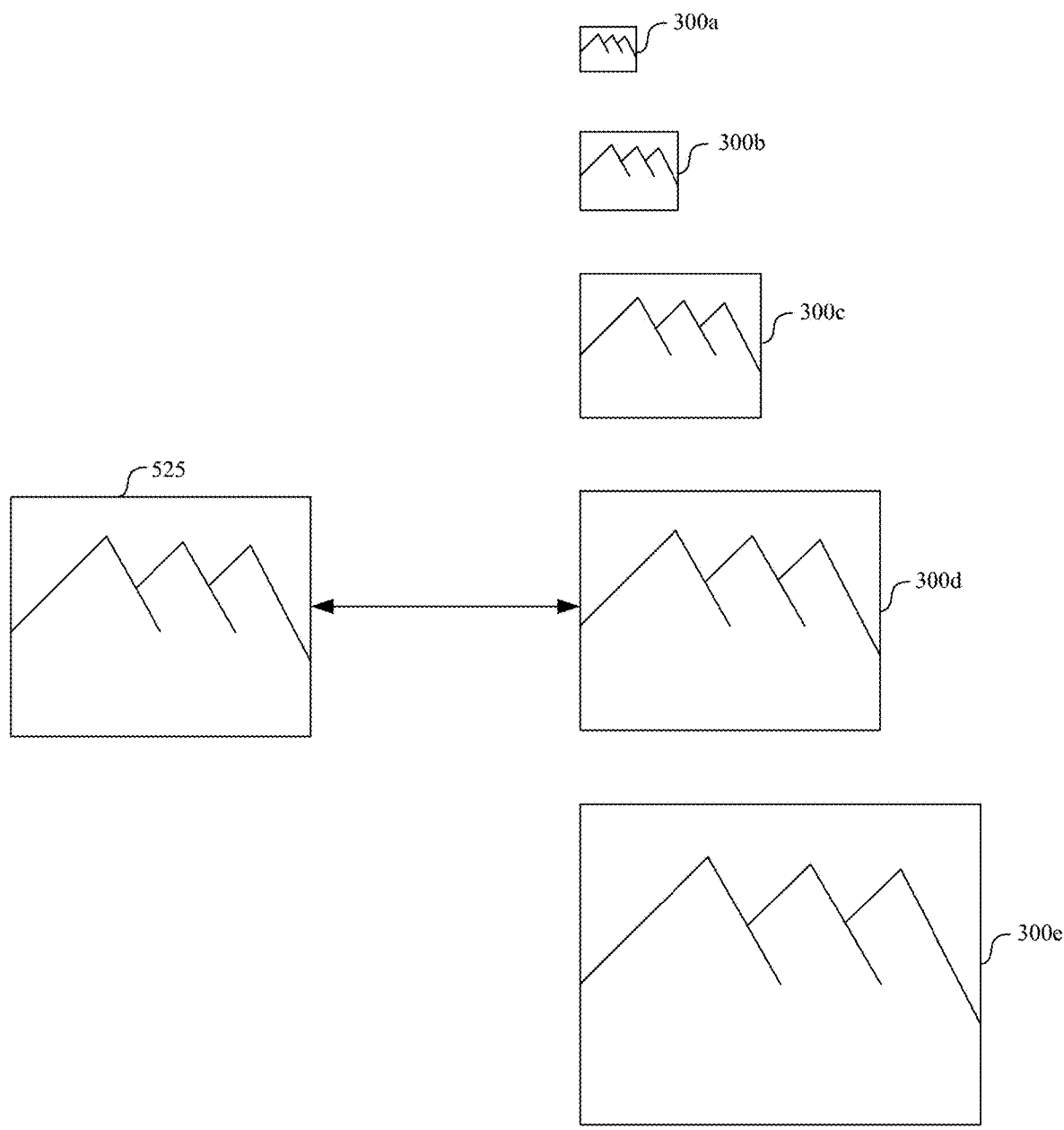
FIG. 6 is a block diagram depicting a selection of a reference image of an object having a scale similar to the scale of an object depicted in the captured real world image of FIG. 5 in accordance with some implementations.
Figure 7:
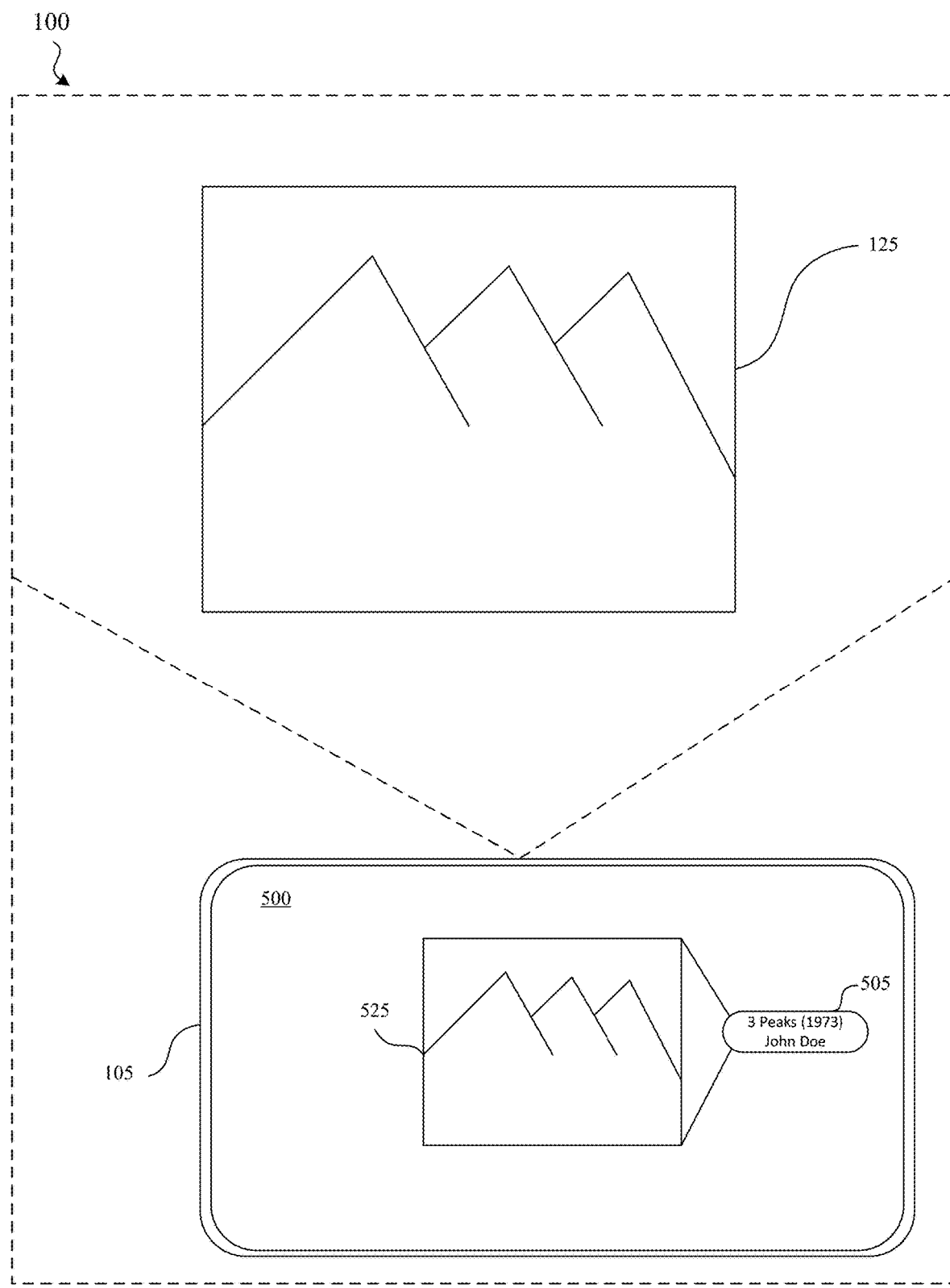
FIG. 7 is a block diagram of the mobile device of FIG. 5 presenting CGR content that includes additional content based on a pose of the object determined based on the selected reference image of FIG. 6.

As will be illustrated in FIGS. 5-7, the depictions of the object 125, including their scale, change as the first user 105 changes the position of the first device 105 relative to the picture 125 in the environment 100. As the first user 105 does so, the pose of the object is accurately and efficiently determined using an appropriate reference image.

FIG. 5 is a block diagram of the first device 105 capturing another image 500 in the environment 100 of FIG. 1 in accordance with some implementations. In this example, the first user 110 has positioned the first device 105 in the environment 100 such that an image sensor of the first device 105 captures an image 500 of the picture 125. In FIG. 5, the first device 105 is significantly closer to the picture 125 than in FIG. 1.

The captured image 500 may be a frame of the same sequence of frames that includes the image 200 of FIG. 2. For example, the first user 110 may be executing an CGR application on the first device 105 and walking around the environment 100. As the first user 110 walks around the environment 100, an image sensor on the first device 105 captures a sequence of frames, e.g., captured images of the environment 100 from different positions and orientations (e.g., camera poses) within the environment 100.

In FIG. 5, the first device 105 has captured and displayed image 500, including a depiction 525 of the picture 125. The depiction 525 of the picture 125 in the image 500 is larger than and thus has a different scale than the depiction of 225 of the picture in the image 200 of FIG. 2. Similarly, as the first user 105 moves around the environment 100, moves the first device 105 or associated image sensor, or as the picture 125 itself is moved, the images of the picture 125 depict the picture 125 from different distances, viewing angles, lighting conditions, blur conditions, etc. These aspects are used singly or in combination to select or adjust an appropriate reference image to use in determining the pose (e.g., position and orientation) of the picture 125.

FIG. 6 is a block diagram depicting a selection of a reference image 300d of the picture 125 having a scale corresponding (e.g., similar) to the scale of the depiction 525 of the object 125 in the captured image 500 of FIG. 5. In some implementations, the scale of the depiction 525 of the picture 125 is determined based on the scale of the object known from a preceding frame in a sequence of frames. For example, the first device 105 may initially detect an object and determine its initial pose (e.g., position and orientation in 3D space) based on an object detection and localization algorithm, visual inertial odometry (VIO) information, infrared data, depth detection data, RGB-D data, other information, or some combination thereof. In this example, in subsequent frames of the sequence of frames, the first device 105 may determine an appropriate transform (e.g., adjustment of the pose) to determine the pose of the object in each subsequent frame. For example, first device 105 may detect and determine the pose of the object relative to the camera of first device 105 in an initial image (e.g., using a sparse feature-comparison technique). The pose determined for the initial image may be used as an estimate for a transform for the same object contained in a subsequent image, and that estimate may be refined to minimize an error between a transformed version of the object contained in the subsequent image and the reference image of the object. Thus, given a current frame, the pose of the object in the preceding frame is known and used to determine a scale of the object in that preceding frame. Assuming that the change in scale is relatively small from frame to frame, the scale of the object in the preceding frame is used as an estimate of the scale of the object in the current frame. If, however, it is determined that the scale of the object has changed from that of the preceding frame, the estimated scale for a subsequent frame may be adjusted accordingly. In other examples, the scale of the object is determined based on information from the current frame without using scale information from a preceding frame. As illustrated in FIG. 6, the scale is used to select an appropriate reference image 300d from a set of reference images 300a-e that depicts the object using a plurality of different scales.

FIG. 7 is a block diagram of the mobile device 105 of FIG. 5 presenting CGR content that includes the depiction 525 of the picture 125 and additional content 505 positioned based on a pose of the object, which is determined based on the selected reference image 300d of FIG. 6. The pose of the object, for example, can be determined by determining an appropriate transform (e.g., adjustment) of a known pose of the object in a preceding frame. For example, this can involve using a pose of the object in the preceding frame as an estimate for the pose of the object in the current frame and selecting a transform that minimizes differences between pixels corresponding to the reference image of the object and pixels corresponding to the depiction of the object in the frame (e.g., the depiction of the object in the frame transformed using the selected transform). The pixels involved in such an optimization can be adjusted for lighting, blur, etc.

In this example, the additional content 505 includes an information bubble with lines that intersect precisely with the corners of the depiction of the picture 525. The precise intersection is enabled by the accurate and efficient determination of the pose of the object using the techniques disclosed herein.

The examples of FIGS. 2-7 illustrate determinations of poses of the picture 125 in two different frames (e.g., image 200 and image 500) in which depictions 225, 525 depict the picture 125 at different scales. The techniques used to determine the pose (e.g., position and orientation of the picture 125) account for scale in a way that can make the determinations of pose more accurate and efficient. The determination of scale can additionally account for lighting and blur differences to further improve accuracy and efficiency. The determined poses can be determined with sufficient efficiency to allow additional content 505 to be positioned relative to the depictions 225, 525 of the picture.

The efficient and accurate determination of object poses using techniques disclosed herein can enable or enhance CGR environments. For example, the first user 110 may be executing an CGR application on the first device 105 and walking around the environment 100. As the first user 110 walks around the environment 100, an image sensor on the first device 105 captures a sequence of frames, e.g., captured images of the environment 100 from different positions and orientations (e.g., camera poses) within the environment 100. As each new frame is captured the pose of an object such as picture 125 is tracked and additional content is added to the images that are displayed on the first device 105. The first user 110 walks around the environment 100 and views a live CGR environment on the screen that includes depictions of real world objects such as picture 125 along with additional content that can be precisely located relative to such real world objects based on the accurate and efficient object tracking/pose determination techniques disclosed herein.

Examples of real world objects that can be captured, depicted, and tracked include, but are not limited to, a picture, a painting, a sculpture, a light fixture, a building, a sign, a table, a floor, a wall, a desk, a book, a body of water, a mountain, a field, a vehicle, a counter, a human face, a human hand, human hair, another human body part, an entire human body, an animal or other living organism, clothing, a sheet of paper, a magazine, a book, a vehicle, a machine or other man-made object, and any other item or group of items that can be identified and modeled.

Figure 8:
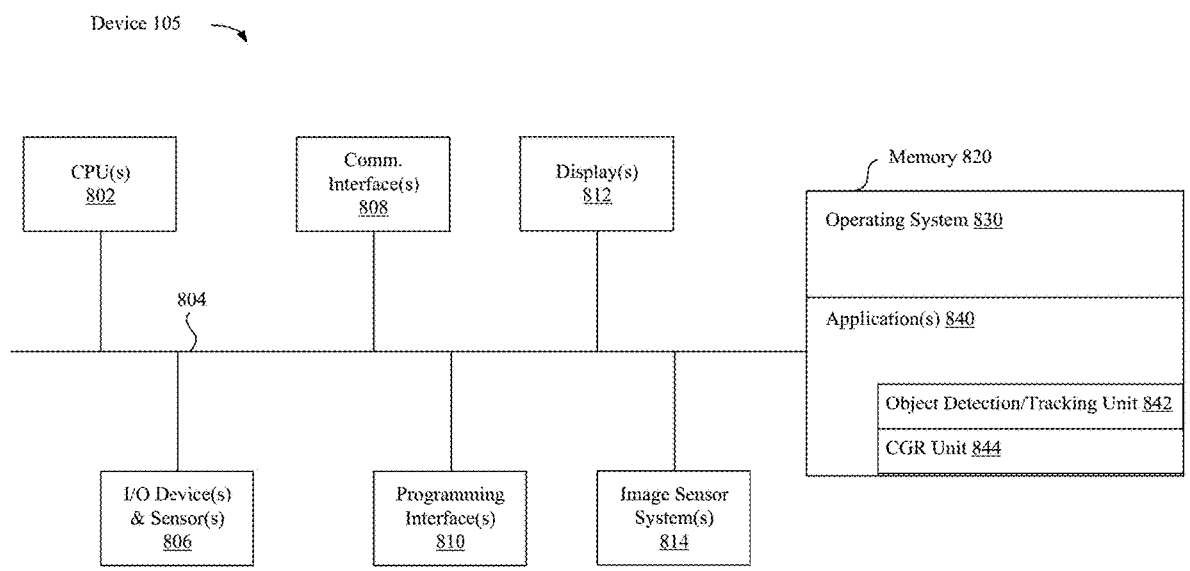
FIG. 8 is a block diagram illustrating device components of an exemplary device according to some implementations.

FIG. 8 is a block diagram illustrating device components of first device 105 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the first device 105 includes one or more processing units 802 (e.g., microprocessors, ASICs, FPGAs, GPUs, CPUs, processing cores, or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 810, one or more displays 812, one or more interior or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like. In some implementations, movement, rotation, or position of the first device 105 detected by the one or more I/O devices and sensors 806 provides input to the first device 105.

In some implementations, the one or more displays 812 are configured to present a CGR environment. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 812 correspond to diffractive, reflective, polarized, holographic, etc. waveguide displays. In one example, the first device 105 includes a single display. In another example, the first device 105 includes an display for each eye. In some implementations, the one or more displays 812 are capable of presenting CGR content.

In some implementations, the one or more image sensor systems 814 are configured to obtain image data that corresponds to at least a portion of a scene local to the first device 105. The one or more image sensor systems 814 can include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 814 further include illumination sources that emit light, such as a flash.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium. In some implementations, the memory 820 or the non-transitory computer readable storage medium of the memory 820 stores the following programs, modules and data structures, or a subset thereof including an optional operating system 830 and one or more applications 840.

The operating system 830 includes procedures for handling various basic system services and for performing hardware dependent tasks. In some implementations, the operating system 830 includes built in CGR functionality, for example, including an CGR experience application or viewer that is configured to be called from the one or more applications 840 to display a CGR environment within a user interface.

The application 840 includes an object detection/tracking unit 842 and a CGR unit 844. The object detection/tracking unit 842 and CGR unit 844 can be combined into a single application or unit or separated into one or more additional applications or units. The object detection/tracking unit 842 is configured with instructions executable by a processor to detect or track an object using one or more of the techniques disclosed herein. The CGR unit 844 is configured with instructions executable by a processor to provide a CGR environment that include depictions of real world object and additional content that may be positioned based on the detection and tracking of objects using one or more of the techniques disclosed herein.

In some implementations, the block diagram illustrating components of first device 105 can similarly represent the components of an HMD, such as second device 115. Such an HMD can include a housing (or enclosure) that houses various components of the head-mounted device. The housing can include (or be coupled to) an eye pad disposed at a proximal (to the user) end of the housing. In some implementations, the eye pad is a plastic or rubber piece that comfortably and snugly keeps the HMD in the proper position on the face of the user (e.g., surrounding the eye of the user). The housing can house a display that displays an image, emitting light towards one or both of the eyes of a user.

FIG. 8 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 9 is a flowchart representation of a method 900 for presenting CGR content based on a pose of an object in a current frame. In some implementations, the method 900 is performed by a device (e.g., first device 105 of FIGS. 1-8). The method 900 can be performed at a mobile device, desktop, laptop, or server device. The method 900 can be performed on a head-mounted device (e.g., second device 115) that has a screen for displaying 2D images or screens for viewing stereoscopic images. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 910, the method 900 obtains image data representing a physical environment. Such image data can be acquired using an image sensor such as camera. In some implementations, the image data comprises a sequence of frames acquired one after another or in groups of images. Image data can include pixel data identifying the color, intensity, or other visual attribute captured by an image sensor.

Figure 11:
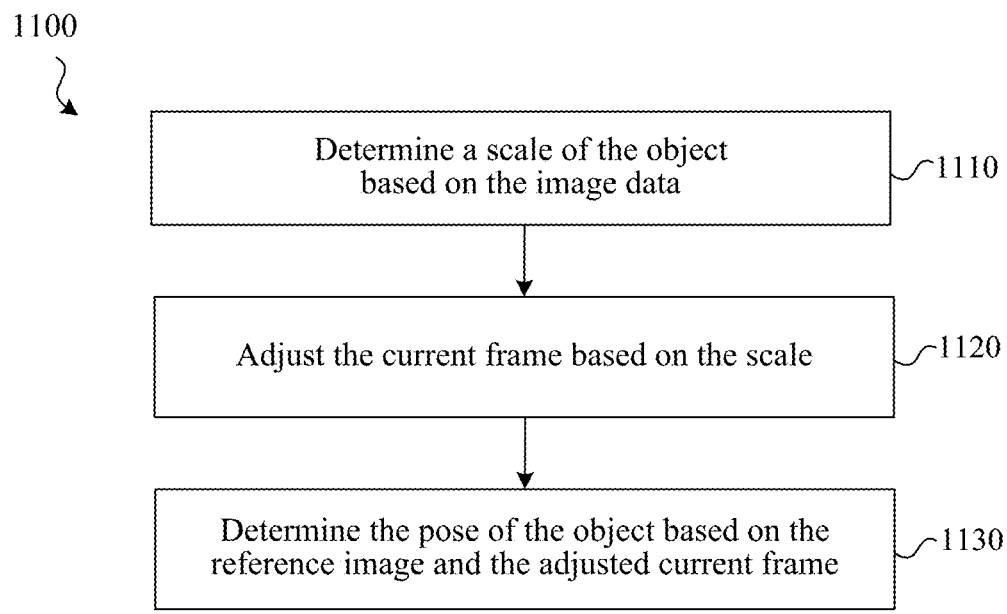
FIG. 11 is a flowchart representation of a method for determining a pose of an object based on a reference image and a depiction of the object in a current frame adjusted based on a scale of the object.

At block 920, the method 900 determines a pose of an object in a current frame of the image data. In some implementations, the pose of the object in the current frame is determined by determining pose attributes of the pose of the object in the current frame using an optimization that accounts for differences between pixels in the current frame corresponding to the object and pixels of a reference image. For example, this can involve determining a pose of the object in a current frame using the pose of the object in a preceding frame as an initial estimate and refining this estimate by, e.g., selecting a transform that results in a current frame pose such that differences between the object's pixels associated with that pose in the current frame (transformed by the selected transform) have a minimum amount of differences to the pixels in the reference image. An optimization or other technique that determines a pose by comparing the current frame image with a reference image can use scale to improve its efficiency and accuracy. FIGS. 10 and 11, discussed below, illustrate exemplary techniques for determining a pose of an object based on scale.

In some implementations, an initial object detection or initial pose identification technique is used to initially determine a pose of the object and then, the pose of the object in subsequent frames is determined by determining a transform from the respective preceding frame pose. For example, in some implementations, this involves detecting a presence of the object (e.g., that the current frame includes a depiction of the object and the identity of the object) and determining an initial pose of the object in an initial frame of the frames using a sparse feature-comparison technique. For the second frame, a pose of the object in the initial frame can be used as an initial estimate for the pose of the object in the second frame and this estimate may be refined by, e.g., selecting a transform that results in a second frame pose such that differences between the object's pixels associated with that pose in the second frame (transformed by the selected transform) have a minimum amount of differences to the pixels in the reference image. For the third frame, a pose of the object in the second frame may be used as an initial estimate for the pose of the object in the third frame and this estimate may be refined by, e.g., selecting a transform that results in a third frame pose such that differences between the object's pixels associated with that pose in the third frame (transformed by the selected transform) have a minimum amount of differences to the pixels in the reference image. This process of determining a new transpose and associated new pose with each current frame continues, providing ongoing information about the current pose in each current frame as new frames are received.

Additionally, or alternatively, an optimization or other technique that determines a pose by comparing the current frame image with a reference image can make an adjustment to the current frame image or the reference image to account for the environment conditions, e.g., lighting, blur, etc. Such adjustments can further improve the accuracy and efficiency of the pose determination. In one example, pixels in either image can be adjusted based on lighting. Lighting can be estimated or determined for a preceding frame, determined using an ambient light sensor, or determined using any other viable technique. Blocks of pixels, e.g., small regions or grid portions of multiple pixels, can be adjusted based on a lighting associated with each. Thus, for example, the pixels in different portions, e.g., rectangular regions, of a reference image can be adjusted by different amounts based on different lighting conditions occurring in corresponding portions of the current frame image. Alternatively, pixels in different portions, e.g., rectangular regions, of the current frame image can be adjusted to have a standard or uniform lighting to match that of the reference image. This accounts for the possibility that the lighting on an object can vary across the surface or surfaces of the object.

In another example, pixels in either image can be adjusted based on blur. Blur can be estimated or otherwise determined based on the transforms associated with object poses in preceding frames. For example, large transforms can be indicative of a fast moving image sensor or environmental changes that will likely result in blur. The amount of blur can be estimated based on the magnitude of the transforms. In these examples, a blurring operation may be performed on the reference image based on the direction and amount of blurring determined for the current image frame. In another example, a deblurring operation may be performed on the current frame image, which can then be used along with the reference image for pose determination. In another example, blur is estimated or otherwise determined based on a motion sensor on the device.

At block 930, the method 900 presents CGR content depicting the physical environment and additional content based on the pose of the object. The CGR content thus includes visual content that combines real world content with additional content, such as virtual reality (VR) content. CGR content can be experienced by a user using a mobile device, head-mounted device (HMD), or other device that presents the visual or audio features of the environment. The experience can be, but need not be, immersive, e.g., providing most or all of the visual or audio content experienced by the user. CGR can be video-see-through (e.g., in which real world content is captured by a camera and displayed on a display with additional content) or optical-see-through (e.g., in which real world content is viewed directly or through glass and supplemented with displayed additional content). For example, a CGR system may provide a user with video see-through CGR on a display of a consumer cell-phone by integrating rendered three-dimensional ("3D") graphics into a live video stream captured by an onboard camera. As another example, a CGR system may provide a user with optical see-through CGR by superimposing rendered 3D graphics into a wearable see-through head mounted display ("HMD"), electronically enhancing the user's optical view of the real world with the superimposed additional content.

FIG. 10 is a flowchart representation of a method 1000 for determining a pose of an object based on a reference image selected based on a scale of the object. In some implementations, the method 1000 is performed by a device (e.g., first device 105 of FIGS. 1-8). The method 1000 can be performed at a mobile device, desktop, laptop, or server device. The method 1000 can be performed on a head-mounted device (e.g., second device 115) that has a screen for displaying 2D images or screens for viewing stereoscopic images. In some implementations, the method 1000 is performed by processing logic, including hardware, firmware, software, or a combination thereof. In some implementations, the method 1000 is performed by a processor executing code stored in a non-transitory computer-readable medium (e.g., a memory).

At block 1010, the method 1000 determines a scale of the object based on the image data. In some implementations, the scale is determined using a current or preceding frame in the sequence of frames. For example, the device may initially detect an object and determine its initial pose (e.g., position and orientation in 3D space) based on an object detection and localization algorithm, visual inertial odometry (VIO) information, infrared data, depth detection data, RGB-D data, other information, or some combination thereof. In this example, in subsequent frames of the sequence of frames, the device may determine an appropriate transform (e.g., adjustment of the pose) to determine the pose of the object in each subsequent frame. Thus, given a current frame, the pose of the object in the preceding frame is known and used to determine a scale of the object in that preceding frame. Assuming that the change in scale is relatively small from frame to frame, the scale of the object in the preceding frame is used as an estimate of the scale of the object in the current frame. If, however, it is determined that the scale of the object has changed from that of the preceding frame, the estimated scale for a subsequent frame may be adjusted accordingly. In other examples, the scale of the object is determined based on information from the current frame without using scale information from a preceding frame.

At block 1020, the method 1000, based on the scale, selects a reference image of the object from a set of multiple reference images corresponding to different scales. In some examples, the set of multiple reference images may include images created by adjusting (e.g., interpolating) one or more provided reference images. As illustrated in FIGS. 3 and 6, a scale of the reference image of an object is selected that is the same as or similar to the scale of the depiction of an object in the current image. In some implementations, the reference image having the closest scale to the estimated scale of the object in the current image is selected. In some implementations, resolution values (e.g., x pixels by y pixels, total pixel numbers, diagonal pixel counts, etc.) associated with scale are used to select the reference image.

At block 1030, the method 1000 determines the pose of the object based on the selected reference image and the current frame. In some implementations, the pose is determined based on a single reference image, e.g., corresponding to the entire object. In other implementations, the pose is determined based on multiple reference images of the object corresponding to different scales for different portions of the object. In one example, this involves determining a pixel-wise scale of the object, for each pixel, selecting or interpolating a respective reference image of the multiple reference images, and determining the pose of the object in the current frame based on the reference images selected or interpolated for each pixel.

The pose can be determined by determining pose attributes of the pose of the object in the current frame using an optimization that accounts for differences between pixels in the current frame corresponding to the object and pixels of a selected reference image. For example, this can involve determining a transform of a pose in a current frame using the pose of the object in a preceding frame as an initial estimate and refining this estimate by, e.g., selecting a transform that results in a current frame pose such that differences between the object's pixels associated with that pose in the current frame (transformed by the selected transform) have a minimum amount of differences to the pixels in the reference image. Selecting a reference image based on scale can improve the efficiency and accuracy of the pose determination.

FIG. 11 is a flowchart representation of a method for determining a pose of an object based on a reference image and a depiction of the object in a current frame adjusted based on a scale of the object. In some implementations, the method 1100 is performed by a device (e.g., first device 105 of FIGS. 1-8). The method 1100 can be performed at a mobile device, desktop, laptop, or server device. The method 1100 can be performed on a head-mounted device (e.g., second device 115) that has a screen for displaying 2D images or screens for viewing stereoscopic images. In some implementations, the method 1100 is performed by processing logic, including hardware, firmware, software, or a combination thereof. In some implementations, the method 1100 is performed by a processor executing code stored in a non-transitory computer-readable medium (e.g., a memory).

At block 1110, the method 1100 involves determining a scale of the object based on the image data and can involve similar processes as those discussed with respect to block 1010 of FIG. 10.

At block 1120, the method 1100 involves adjusting the current frame based on the scale. In some implementations, this involves up-scaling or down-scaling the current frame (or a portion thereof) to have a scale that matches or is more similar to the scale of a reference image. In some implementations, only a single reference image is stored for an object and the current image is scaled to match the reference image. In other implementations, multiple reference images are stored for an object and, if necessary, a current image is scaled to match the closest of the reference images.

At block 1130, the method 1100 involves determining the pose of the object based on the reference image and the adjusted frame. The pose can be determined by determining pose attributes of the pose of the object in the current frame using an optimization that accounts for differences between pixels in the adjusted current frame corresponding to the object and pixels of a reference image. For example, this can involve determining a pose of the object in a current frame using the pose of the object in a preceding frame as an initial estimate and refining this estimate by, e.g., selecting a transform that results in a current frame pose such that differences between the object's pixels associated with that pose in the current frame (transformed by the selected transform) have a minimum amount of differences to the pixels in the reference image. Adjusting a current frame based on scale can improve the efficiency and accuracy of the pose determination.

The techniques disclosed herein provide advantages in a variety of circumstances and implementations. In one implementation, an app on a mobile device (mobile phone, HMD, etc.) is configured to store or access information about objects, e.g., paintings, sculptures, poster etc., in a particular venue, such as a movie theater or museum. The user is able to point the image sensor of the mobile device to capture images of an object and view a CGR experience that provides virtual content about the object and in a screen location based on the object's determined pose. For example, the user may capture an image of a movie poster, and the device may detect the poster and its pose, identify information based on the identity of the poster, such as a movie trailer associated with the movie depicted in the poster, and present a virtual object adjacent to the poster in the CGR environment that plays the trailer. The trailer remains adjacent to the poster even as the user moves around and the relative position and size of the poster in the captured frames changes. In another example, the user captures an image of a poster of a space ship and the device presents a VR spaceship flying around the poster.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    on a computing device having a processor, a memory, and an image sensor:
    obtaining image data representing a physical environment using the image sensor, the image data comprising a sequence of frames;
    determining a scale of an object in a current frame of the sequence of frames;
    based on the scale, selecting or interpolating a reference image of the object;
    determining a pose of the object in the current frame based on the selected or interpolated reference image and the current frame; and
    presenting computer-generated reality (CGR) content on a display, the CGR content depicting the physical environment and additional content based on the pose of the object in the current frame.

2. The method of claim 1, wherein the pose is determined based on a single reference image, wherein the single reference image is selected from a set of multiple reference images of the object corresponding to different scales.

3. The method of claim 1, wherein the pose is determined based on multiple reference images of the object corresponding to different scales.

4. The method of claim 1, wherein the scale is determined using a preceding frame in the sequence of frames.

5. The method of claim 1, wherein the pose of the object in the current frame is determined by determining pose attributes of the pose of the object in the current frame using an optimization that accounts for differences between transformed pixels in the current frame corresponding to the object and pixels of the selected or interpolated reference image.

6. The method of claim 1 further comprising adjusting the pixels of the selected or interpolated reference image based on lighting, wherein the lighting is determined based on the preceding frame or using an ambient light sensor.

7. The method of claim 1 further comprising adjusting the pixels of the selected reference image based on blur wherein the blur is determined based on transforms associated with object poses in preceding frames or a motion sensor on the computing device.

8. The method of claim 1 further comprising detecting a presence of the object and an initial pose of the object in an initial frame of the frames using a sparse feature-comparison technique; and
    determining poses of the object in each subsequent frame after the initial frame based on a respective reference image of the object, the respective reference image for each subsequent frame selected from the set of reference images based on a respective previous frame scale.

9. The method of claim 3, wherein:
    determining the scale of the object comprises determining a pixel-wise scale of the object;
    selecting or interpolating the reference image of the object comprises, for each pixel, selecting or interpolating a respective reference image of the multiple reference images based on the pixel-wise scale; and
    determining the pose of the object in the current frame based on the selected or interpolated reference image and the current frame comprises determining the pose of the object in the current frame based on the reference images selected or interpolated for each pixel.

10. The method of claim 5, wherein the pose of the object in the current frame is determined using a pose of the object in a preceding frame as a starting point.

11. The method of claim 6, wherein the pixels in different portions of the selected or interpolated reference image are adjusted by different amounts based on different lighting conditions corresponding to the different portions.

12. A method comprising:
    on a computing device having a processor, a memory, and an image sensor:
    obtaining image data representing a physical environment using the image sensor, the image data comprising a sequence of frames;
    determining a scale of an object in a current frame in the sequence;
    adjusting the current frame based on the scale;
    determining a pose of the object in the current frame based on a reference image and the adjusted current frame; and
    presenting computer-generated reality (CGR) content on a display, the CGR content depicting the physical environment and additional content based on the pose of the object in the current frame.

13. The method of claim 12, wherein the scale is determined using a preceding frame in the sequence of frames.

14. The method of claim 12, wherein the pose of the object in the current frame is determined:
    by determining pose attributes of the pose of the object in the current frame using an optimization that accounts for differences between transformed pixels in the adjusted current frame corresponding to the object and pixels of the reference image; or
    using a pose of the object in a preceding frame as a starting point.

15. The method of claim 12 further comprising adjusting the pixels of the current frame based on lighting, wherein the lighting is determined based on the preceding frame or an output of an ambient light sensor.

16. The method of claim 12, wherein the pixels in different portions of the current frame are adjusted by different amounts based on different lighting conditions corresponding to the different portions.

17. The method of claim 12 further comprising adjusting the pixels of the current image based on blur, wherein the blur is determined based on:
    transforms associated with object poses in preceding frames; or
    a motion sensor on the computing device.

18. The method of claim 12 further comprising:
    detecting a presence of the object and an initial pose of the object in an initial frame of the frames using a sparse feature-comparison technique; and
    determining poses of the object in each subsequent frame after the initial frame based on a scaling the respective subsequent frame, the respective subsequent frame scaled based on a respective previous frame scale.

19. A system comprising:
    a non-transitory computer-readable storage medium;
    a camera; and
    one or more processors coupled to the non-transitory computer-readable storage medium, wherein the non-transitory computer-readable storage medium comprises program instructions that, when executed on the one or more processors, cause the system to perform operations comprising:

obtaining image data representing a physical environment using the image sensor, the image data comprising a sequence of frames;

determining a scale of the object;

based on the scale, selecting or interpolating a reference image of the object;

determining a pose of the object in the current frame based on the selected or interpolated reference image and the current frame; and presenting computer-generated reality (CGR) content on a display, the CGR content depicting the physical environment and additional content based on the pose of the object in the current frame.

20. The system of claim 19, wherein the pose is determined based on:

a single reference image, wherein the single reference image is selected from a set of multiple reference images of the object corresponding to different scales; or multiple reference images of the object corresponding to different scales.

21. The system of claim 19, wherein the pose of the object in the current frame is determined by determining pose attributes of the pose of the object in the current frame using an optimization that accounts for differences between transformed pixels in the current frame corresponding to the object and pixels of the selected or interpreted reference image.

22. The system of claim 19, wherein the operations further comprise adjusting the pixels of the selected reference image based on lighting, wherein the lighting is determined based on the preceding frame or using an ambient light sensor, wherein the pixels in different portions of the selected or interpolated reference image are adjusted by different amounts based on different lighting conditions corresponding to the different portions.

23. The system of claim 19, wherein the operations further comprise adjusting the pixels of the selected or interpolated reference image based on blur, wherein the blur is determined based on transforms associated with object poses in preceding frames or a motion sensor on the computing device.

24. The system of claim 20, wherein:

determining the scale of the object comprises determining a pixel-wise scale of the object, wherein the scale is determined using a preceding frame in the sequence of frames;

selecting or interpolating the reference image of the object comprises, for each pixel, selecting or interpolating a respective reference image of the multiple reference images based on the pixel-wise scale; and determining the pose of the object in the current frame based on the selected or interpolated reference image and the current frame comprises determining the pose of the object in the current frame based on the reference images selected or interpolated for each pixel.

25. The system of claim 21, wherein the pose of the object in the current frame is determined using a pose of the object in a preceding frame as a starting point.

* * * * *